United States Patent [19]

Haas et al.

[11] 3,885,874

[45] May 27, 1975

[54] LASER PLASMA DIAGNOSTIC USING RING RESONATORS

[75] Inventors: Roger A. Haas, Manchester; Peter P. Chenausky, Farmington; Robert J. Freiberg, South Windsor, all of Conn.

[73] Assignee: The United States of America as represented by the United States Energy Research and Development Administration, Washington, D.C.

[22] Filed: Jan. 11, 1974

[21] Appl. No.: 434,528

[52] U.S. Cl............................ 356/107; 356/106 LR
[51] Int. Cl. .............................................. G01b 9/02
[58] Field of Search........... 356/106 R, 106 LR, 107

[56] References Cited
UNITED STATES PATENTS

| | | | |
|---|---|---|---|
| 3,528,029 | 9/1970 | Holmboe et al.............. | 356/106 LR |
| 3,539,262 | 11/1970 | Pryor................................. | 356/107 |

OTHER PUBLICATIONS

Multipass Laser Interferometry for Plasma Study; Heckenberg et al.; Rev. of Sci. Inst.; Vol. 42, No. 7; July 1971; pp. 977–980.

Primary Examiner—Vincent P. McGraw
Attorney, Agent, or Firm—John A. Horan; C. Daniel Cornish

[57] ABSTRACT

This invention describes a system for measuring the electron number density of a plasma, which employs a laser interferometric plasma diagnostic technique and which provides significant improved time response compared to conventional laser interferometers. The method of achieving improved time response locates the plasma in one arm of a laser-excited, transmission ring resonator cavity. The response time of the interferometer is then limited only by the Q of the ring resonator cavity and is independent of the gain, the cavity Q, and the collisional lifetimes associated with the laser source.

10 Claims, 5 Drawing Figures

Fig—1

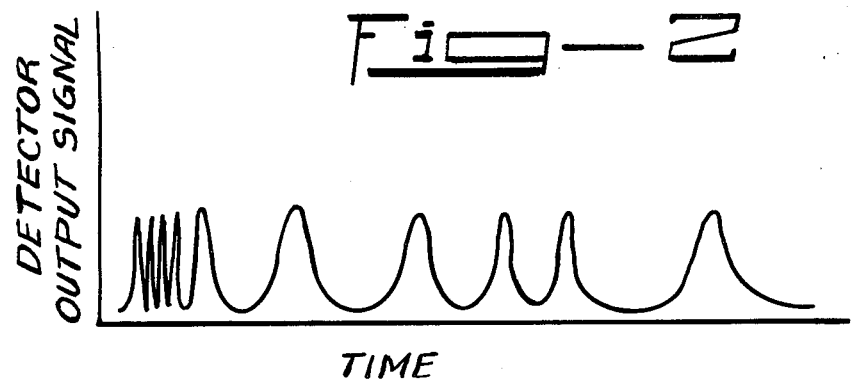
Fig-2
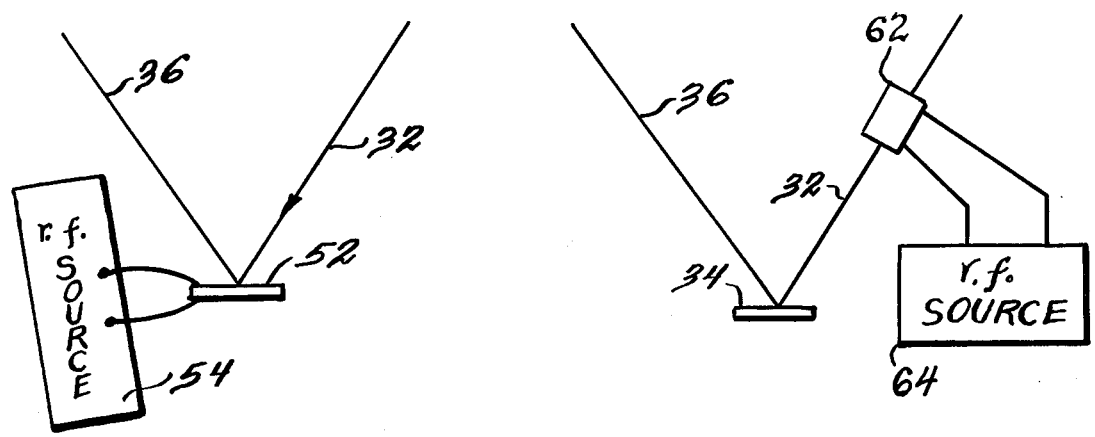
Fig-3
Fig 5
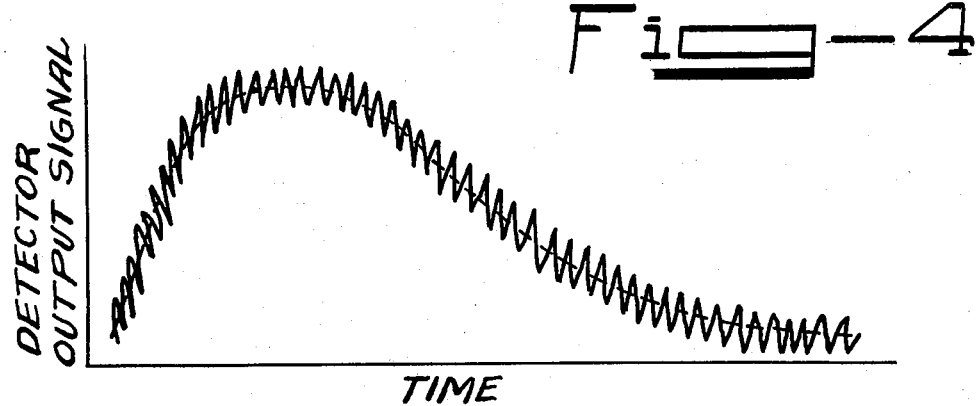
Fig-4

LASER PLASMA DIAGNOSTIC USING RING RESONATORS

BACKGROUND OF THE INVENTION

In the field of plasma physics it is often necessary to determine the particle number density associated with temporally varying plasmas. In recent years laser interferometers, e.g., as described on page 145 of Vol. 40, No. 1 of the Review of Scientific Instrument (Jan. 1969), have been used quite extensively in measurements of timevarying indices of refraction of plasmas. (The index of refraction of the plasma depends primarily on the electron density.) Laser interferometers have at least two advantages over previous techniques for measuring electron density. First, they can be used for densities greater than about $10^{13}$ cm$^{-3}$ which are above the useful range of most microwave systems. The second major advantage is that the measurement does not depend on other properties of the plasma, as is the case of spectroscopic techniques, for example, which require local thermal equilibrium of the plasma medium. Thus, laser interferometers can be used in the study of plasmas whose densities cannot be determined accurately in other ways.

Conventional laser interferometers consist of two coupled resonators employing three mirrors arranged in a linear resonator geometry. The active laser medium is situated between the first and second mirrors. The second and third mirrors are both partially reflecting and form a Fabry-Perot etalon containing the plasma whose index of refraction is to be measured. Thus, the etalon containing the plasma acts as one of the reflectors of the laser resonator. When the laser radiation radian frequency, $\omega$, is much greater than the plasma electron momentum transfer collision frequency and electron cyclotron frequency, if a magnetic field is present, then the local index of refraction, $\mu$, is related to the plasma electron density, $n_e$, by $\mu = \sqrt{1 - n_e/n_{ec}}$ where $n_{ec} = m_e \omega^2/(4\pi e^2)$ is the cut off electron density and the electron mass is $m_e$. Since this is the case in many practical applications these conditions will be assumed to hold in the following discussion.

The reflectivity of the etalon depends upon the normalized optical length, or the phase shift per pass, of the etalon, $$\phi = k \int_0^\ell \mu \, dx,$$

and therefore, a change in the electron density of the plasma causes a change in the output intensity of the coupled cavity laser system. The magnitude and temporal characteristics of this response depend upon the Q of the laser cavity, the gain of the laser discharge, and the lifetimes of the collisional process contributing to the laser transition.

In essence, previous interferometers have worked by counting "fringes," that is, by observing the number of maxima through which the laser output intensity passes due to a change in electron density. This observation of successive maxima and minima yields the variation in electron density with time. The sensitivity of this technique, however, is limited by the inability to measure changes of less than one fringe, corresponding to an average electron density along the direction of propagation of $$<n_e> = \frac{1}{\ell_p}\int_0^{\ell_p} n_e \, dx < 1/2 \; m_e c^2 k / (e^2 \ell_p),$$

where $c$ is the speed of light, $e$ is the unit of electron change, and $l_p$ is the plasma length along the direction of propagation of the laser radiation through the plasma. The above limitation can be circumvented by certain fractional fringe detection schemes to be discussed later in connection with the present invention.

Experience with conventional laser interferometers in measuring the average electron density, $<n_e>$, of temporally varying plasmas has shown that the time response of the laser interferometer limits its use to the measurement of characteristic plasma time variations longer than 10 $\mu$sec. This time response is limited by the Q of the laser cavity, the gain of the laser discharge, and the lifetimes of the collisional processes within the laser discharge.

This invention provides a system for extending the time response of laser interferometers by more than two orders of magnitude without alteration of the sensitivity or spatial resolution of the interferometer.

SUMMARY OF THE INVENTION

In accordance with this invention, a system is provided for measuring the electron number density of a temporally decaying plasma with significantly improved time response than heretofore possible with conventional laser interferometers. This invention employs an external probe laser and an independent transmission ring resonator which serves as the reference cavity containing the plasma under investigation. The ring geometry of the reference cavity decouples its operation from that of the external laser without requiring additional isolating elements. A portion of the laser light incident upon the ring resonator, propagates around the ring passing through the plasma with each round trip. Provision is made to extract some of the circulating laser light and to detect the resultant fringe pattern (variations of output intensity which can be directly related to electron number density changes of the plasma. To this end, the method of this invention for measuring the electron density of the plasma, consists of producing the plasma within at least one arm of an optical transmission ring resonator, exciting the resonator with circulating laser light transmitted through the plasma and circulated therein in a circuit that does not direct light back into the probe laser, interacting the light circulating in the resonator and through the plasma with laser light that is injected into the resonator anew to produce the desired output fringe pattern, and detecting the resulting fringe pattern which is related to the plasma electron density. This fringe pattern can be detected in the form of a series of photodetector output peaks whose spacing corresponds to the given average electron density change of the sample plasma along the direction of propagation of the laser radiation. Also, the change in spacing of the output peaks indicates the variation in the range of the density change. Thus, this invention provides a versatile and accurate system for measuring the change and the rate of change in the average electron density of the time varying plasma.

It is an object of this invention, therefore, to provide a simple, reliable, sensitive means with fast time response for measuring the electron density of a temporally varying plasma by employing an external plasma reference cavity which is completely decoupled from the probe laser source.

With the proper selection of steps and elements, and their proper sequence and arrangement, as described in more detail hereinafter, the desired plasma electron number density measurement is achieved.

BRIEF DESCRIPTION OF THE DRAWING

In the figures, where like elements are referenced alike:

FIG. 2 is a typical graphic illustration of the output signal of the apparatus of FIG. 1;

FIG. 3 is a partial schematic representation of a modification of the embodiment shown in FIG. 1;

FIG. 4 is an example of the type of signal received from the modification of FIG. 3;

FIG. 5 shows schematically another modification of the embodiment of FIG. 1 having an electro-optical phase modulator in one arm of the ring resonator.

DESCRIPTION OF THE PREFERRED EMBODIMENT

Figure 1:
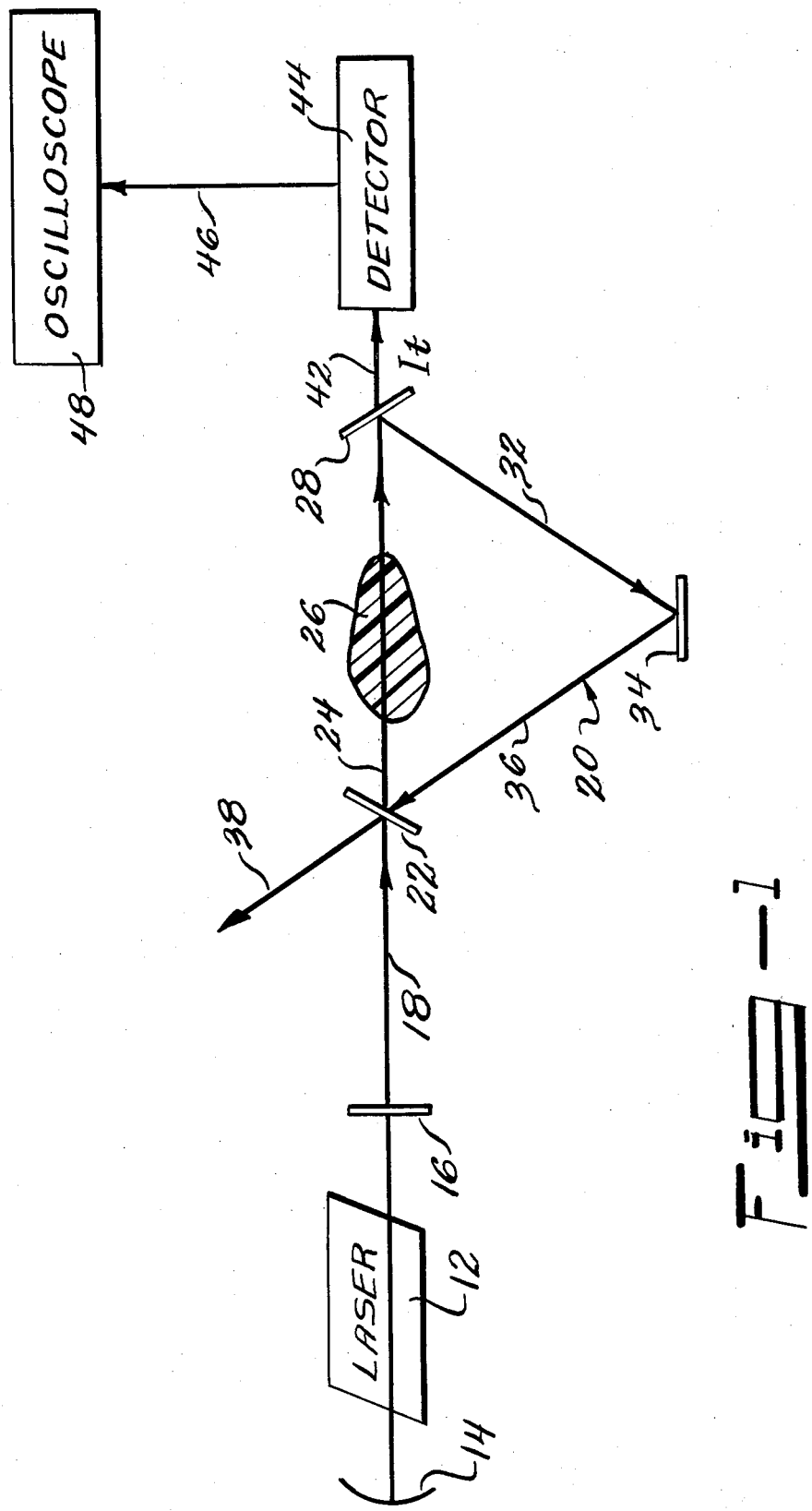
FIG. 1 is a partial schematic representation of one embodiment of the plasma diagnostic system of this invention showing the external probe laser, the ring resonator, the sample plasma and the detector.

Referring to FIG. 1, the principle of this invention are shown in one embodiment that is particularly useful in measuring the index of refraction and/or the electron number density of a plasma over a range of electron number densities. For instance, when a $CO_2$ laser is employed this range of electron densities is between about $10^{19}$ cm$^{-3}$ and $10^{-13}$ cm$^{-3}$ or less. In accordance with this invention, any lasing wavelength within a wide range of wavelengths, associated with the various available lasing transitions, can be used. The lasing wavelength being chosen for optimum sensitivity to the electron density change anticipated.

Referring to FIG. 1, the laser-ring resonating system of this invention employs an external laser 12, which has spaced mirrors 14 and 16 on the opposite ends thereof in a standard laser oscillator cavity arrangement. The laser 12 emits the desired coherent electromagnetic radiation, in the form of a coherent collimated laser beam of predetermined frequency and wavelength, in one direction along the main laser light path 18 which is aligned such that it is collinear with the optical axis of the ring resonator 20 upon transmission through the partially reflecting mirror 22. A fraction of the laser light in path 18 is transmitted through partially transmitting mirror 22 in an arm 24 of the ring resonator 20 containing the sample of plasma 26 whose electron density is to be measured. The remainder of the laser light in path 18 is reflected by the partially transmitted mirror 22 along the path 38. Plasma 26 may be contained within a chamber with appropriate windows for the passage therethrough of the laser beams or may not be contained in a chamber at all. Thereupon, a portion of the laser light passing through plasma 26 is reflected and circulated, in the resonator 20 by partially transmitting mirror 28, which redirects this reflected portion of the light into arm 32 of the ring resonator 20. Mirror 34, in turn, reflects the incident laser light into arm 36 of the resonator toward the first mirror 22 located at one end of arm 24 of the resonator 20. A portion of the circulated light, which has completed at least one cycle in the resonator circuit passes through sample 26 once again. A fraction is reflected again by mirror 28. This procedure repeats itself with each round trip through the ring resonator. The output of the ring resonator which propagates along the path 42 is representative of the transmitted portions of mirror 28 associated with many complete trips around the ring and through the plasma 26. The resultant output consists of a series of intensity fluctuations which take the form of a fringe pattern. The output along path 42 is received by photodetector 44 which in turn transmits the output signal, as shown by arrow 46, to oscilloscope 48 for observation as described in more detail hereinafter.

A suitable photodetector for this application, when a $CO_2$ laser is employed, is described in the Santa Barbara Research Center (Hughes Aircraft) Infrared Brochure on pages 13 and 14 (1971) as model SBRC-71CM.

It will, thus, be seen that the resonator 20 continuously circulates laser light through the sample 26, substantially without resonance with the sample 26 or absorption thereby, over a broad range of cycles, each one of which produces its own specific, particular and characteristic phase shift, depending on the pathlength $l_p$ and the index of refraction of the sample 26 which in turn is directly related to the plasma density at the time of transmission through the plasma sample 26.

Laser 12 continuously injects laser light along the main laser light path 18 along a common axis with the reference light circulating in the ring resonator 20, and this injection produces the fringe pattern which is representative of the light amplitude output variation transmitted through mirror 28 at the end of arm 24 of the resonator. A typical graphical presentation of the fringe pattern detected by detector 44 and displayed by the oscilloscope 48 is shown in FIG. 2, the spacing between adjacent peaks giving a direct indication of the rate at which plasma density is changing at that point in time. For plasmas with index of refraction $\mu$ given above the spacing between adjacent peaks corresponds to an average electron number density change along the direction of propagation of $$<n_e> = \frac{1}{2}\, m_e c^2 k/(e^2 l_p)$$

Thus, by observing the spacing and number of the intensity maxima through which the resonator output on path 42 passes, as shown by the oscilloscope 48, the desired measurement of the rate of change and magnitude of the electron density at a given time is achieved.

The described apparatus circumvents the time response limitation of the prior art systems without compromising high spatial resolution. This is accomplished by locating the plasma under investigation in one or more arms of the transmission ring resonator 20, whose response is completely independent of the external probe laser employed to excite the ring reference cavity. Although a three-mirror, three-arm resonator embodiment is shown in FIG. 1, it will be understood that one or more additional arms and mirrors may be used, dictated by the particular plasma generation apparatus employed. The phase shift per pass of the radiation circulating in the resonator changes as the plasma density varies, and the described interference produced with this circulating radiation by injecting laser light anew into the resonator from an externally positioned laser, such as laser 12, alters the intensity of the radiation reflected from, or transmitted through the ring resonator, no matter how many arms the resonator has.

It is understood that certain variations may be employed. For example, a curved mirror may be employed for plane mirror 34. Also, a variety of closed path geometries for the ring resonators 20 can be used in accordance with this invention, in all cases of which by virtue of the ring geometry the laser 12 is decoupled from the reference cavity containing the plasma 26 without the use of separate isolation elements. Moreover, the main laser light input in the main laser light path 18 may pass through a conventional lens collimator, or polarizer, and the output from the ring resonator 20 may be passed through a filter or a diffraction grating without departing from the principles described. In one example the light is plane polarized and gaussian in amplitude profile.

Likewise, the spacing and/or reflectivities of the mirrors can be changed, without departing from the principles of this invention, since this merely changes the time constant, $\tau_c = Q/\omega$, of the ring resonator cavity in this invention. To insure a uniform frequency response for this invention the time constant $\tau_c$ must be much less than the characteristic time for variation of the plasma density being measured. This is usually done by altering the Q of the cavity which depends on the length of the cavity and the reflectivities of the cavity mirrors. When the perimeter of the ring resonator cavity is small and/or the reflectivities of the mirrors are low, the Q of the cavity is low and hence the cavity time constant is small. However, because the Q of the cavity is small the intensity peaks of the output signal are not sharp and their amplitude is reduced. On the other hand, when the perimeter of the ring resonator is large and/or the reflectivities of the mirrors are large the Q of the cavity is high and the intensity peaks of the output signal are sharp and increased in intensity. However, when the cavity Q is increased the cavity time constant is also increased proportionally. Hence when applying the present invention it is good practice to choose the Q of the ring resonator cavity so as to optimize both the frequency response (ring resonator cavity time constant) and sensitivity (sharpness of output intensity maxima) of the invention for the range of plasma conditions to be studied. In addition, it should be noted that an output signal from resonator 20 may be taken from mirror 22 along path 38 if desired, instead of along path 42 as shown.

Although a wide variety of laser wavelengths can be employed, a $CO_2$ laser 12 having a wavelength of 10.6$\mu$ can be conveniently employed, to measure the majority of practical plasma densities that are available. Shorter laser wavelengths are required for higher plasma densities. No matter how many resonator arms are employed with the ring resonator 20 of this invention, the response time is determined only by the Q of the ring resonator. Although the response time may be varied by changing the reflectivities and/or separation of the mirrors thereof, this invention still significantly improves the time response over the measurement systems known heretofore without incurring a relative loss in sensitivity or spatial resolution. While calibration is not essential for measuring density changes in the plasma sample, such calibration can be accomplished with Langmuir probes inserted into the plasma, and/or using a plasma of known density for the time varying sample. Also, the density can be calculated on theoretical grounds, since a plasma can be treated as a gas, as discussed in "Controlled Thermonuclear Reactions," by Glasstone and Lovberg, Van Nostrand, Princeton, N.J., 1960.

The invention in the embodiment shown in FIG. 1 is limited by its inability to measure changes of less than one fringe which corresponds to an average electron density change along the direction of propagation of $$< n_e > = \tfrac{1}{2} m_e c^2 k/(e^2 l_p)$$

where $m_e$ is the electron mass, $e$ is the electron change, $c$ is the velocity of light, $k$ is the wavenumber of the laser light, and $l_p$ is the length of the plasma sample.

In order to increase the measurement sensitivity such that electron density changes corresponding to much less than one fringe can be made, a technique referred to as fractional fringe detection, which is described in Appl. Opt. 3, 1263, (1964), can be applied.

In order to provide fractional fringe detection, the modification shown in the ring resonator system FIG. 3 may be utilized. There it is seen that stationary mirror 34 is replaced with a vibrating mirror 52. The fractional fringe detection capability is achieved by using mirror 52 to modulate the signal produced by resonator 20. Mirror 52 can be comprised of an x-cut, quartz, piezoelectric, disk substrate that is gold-coated on both surfaces for maximum reflectivity. This modulation mirror 52 can be held at three points on the circumference thereof midway between its two surfaces. The cavity perimeter can be modulated, to provide a fractional fringe detection capability, by applying an rf voltage from the source 54 to the gold surfaces of the mirror 52 causing the quartz substrate to periodically expand and contract on a time scale short compared to the characteristic plasma variation time.

A typical output from the system produced by a fractional fringe detection arrangement is shown in FIG. 4. Fractional fringe detection has the advantage of detecting the maximum electron area ($<n_e>l_p$) of less than $\tfrac{1}{2} m_e c^2 k/(e^2)$.

Such a fractional fringe detection system was actually used in accordance with the embodiment of this invention shown in FIG. 3, and an actual plasma density was determined therewith as understood from the following example.

EXAMPLE

The temporally changing electron density of a pulsed helium gas discharge was measured by placing a discharge tube filled with helium to a pressure of 1–7 torr within a three-mirror transmission ring resonator. The active discharge region between the NaCl Brewster angle windows was 25 cm long and 1.5 cm in diameter.

The coherent, collimated, plane polarized laser light from an external $CO_2$ laser entered and excited the three-mirror ring resonator. The first two mirrors corresponding to the mirrors 22 and 28 in FIG. 1, were both planar with 50 percent reflecting surfaces, dielectrically coated on Irtran II substrates, (Irtran II is transparent for $CO_2$ laser light). The third mirror 52, which had a 2 m radius of curvature and 100 percent reflectivity, was arranged with the other two mirrors to form an equilateral ring resonator cavity with equal distance between the three mirrors.

To provide a fractional fringe detection capability the quartz substrate mirror 52 was resonantly driven with a rf voltage at 1 MHz, its lowest longitudinal vibration resonance.

In operation the ring resonator output was monitored by an AuGe detector corresponding to detector 44 in FIG. 1. In turn the detector output produced a fractional fringe display on the oscilloscope corresponding to the oscilloscope 48 of FIG. 1, as shown in FIG. 4. For the conditions of this particular experiment the peak to peak 1 MHz reference signal, superimposed upon the plasma decay signal, corresponded to $<n_e> \sim 1.6 \times 10^{13}$ cm$^{-3}$.

In the modification of FIG. 5 an electro-optical phase modulator 62 is inserted in arm 32 of resonator 20 to provide fractional fringe detection capability. Modulator 62 may be a crystal that is transparent to the wavelength of the laser light, e.g., Cd telluride for 10.6$\mu$ laser light. A time varying electric field from rf source 64 alters the index of refraction of the crystal making up modulator 62 thereby producing a periodic phase change proportional to the applied voltage. Whereas the vibrating mirror 52 of FIG. 3 would have a vibration capability of up to about 1 MHz, modulator 62 of FIG. 5 has the capability of 250 MHz or more. Such modulators are described in Proc. IEEE 54, 1374 (1966), and 58, 1440 (1970).

This invention has the advantage of providing a sensitive and very fast time response means and method for measuring the electron density of a temporally varying medium. By using a light transmission ring resonator, laser light can be circulated in the resonator without reflecting any of the laser light back into the probe laser so that the laser and ring resonator are cooperative, but the operation of the ring resonator is independent of the operation of the probe laser. Thus, in the technique of this invention, a transmission ring resonator is provided that is excited by the external laser, and the resonator is used as a reference cavity containing the plasma under investigation. The laser is decoupled from the reference cavity without the use of any auxiliary separate isolation elements. Consequently, the sensitivity or the time response of system provided thereby for measuring the electron density of the plasma is not compromised or restricted by the temporal characteristics of the external laser as are laser interferometers of prior art.

What is claimed is:

1. Apparatus for measuring the change in the average electron density of a plasma comprising:
   a. means for producing a laser beam;
   b. ring resonator means independent of the aforesaid means for receiving said laser beam and propagating the same in a closed system without reflecting laser light into said means for producing said laser beam;
   said ring resonator means containing at least a portion of said plasma so that said laser beam continuously circulates cyclically through said portion of said plasma;
   successive portions of said laser beam interfering with the circulating laser beam;
   c. means for extracting circulating laser light from said ring resonator means; and
   d. means for presenting the fringe pattern of the extracted laser light, the spacing in said pattern indicating the rate of change of the electron density of said plasma.

2. The apparatus of claim 1 in which said ring resonator means circulates said laser beam through a plasma that is time varying.

3. The apparatus of claim 1 in which said ring resonator means has at least one arm containing at least a portion of said plasma.

4. The apparatus of claim 1 in which said ring resonator means has at least three mirrors, at least two of which are partially reflecting, for receiving, circulating and extracting said laser beam through at least a portion of said plasma without reflecting laser light into said means for producing said laser beam.

5. The apparatus of claim 1 in which said ring resonator means decouples said circulating laser light from said means for producing said laser beam.

6. The apparatus of claim 2 in which said means for producing said laser beam produces plane polarized laser light having a gaussian amplitude profile, and the said means for circulating the laser light through a temporally changing plasma is a resonator having two partially reflecting mirrors for receiving, circulating and extracting the circulating laser light, and a third mirror for receiving and totally reflecting the circulating laser light from the second mirror to the first mirror.

7. The apparatus of claim 1 in which said ring resonator means has a vibrating mirror means for providing a fractional fringe interference pattern in operable association with said circulating laser beam for detection by said means for presenting said fringe pattern.

8. The apparatus of claim 1 in which said ring resonator means has auxiliary means for receiving and transmitting said circulating laser beam in said ring resonator means, and said auxiliary means has means for rapidly changing the optical length thereof for providing a fractional fringe interference pattern in operable association with said circulating laser beam for presentation by said means for presenting said fringe pattern.

9. The method of measuring the transient, electron density of a temporally varying plasma, comprising the steps of:
   a. producing said plasma within at least one arm of a light transmission ring resonator adapted to be excited by an external laser source;
   b. transmitting laser light from an external laser source to excite the resonator by propagating and continuously circulating the laser light through the plasma in the resonator without reflecting the laser light into the external laser source;
   c. interacting the laser light circulating in the ring resonator with laser light that is injected into the resonator anew as the electron density of the plasma changes to produce an interference
       the interference produced altering the reflection and transmission of the laser light through the resonator, and
   d. detecting the laser light as it is progressively reflected or transmitted from the ring resonator due to said interference as a measure of the electron density of the plasma.

10. The method of claim 9 including the step of producing a fractional fringe interference pattern from said light circulating in said ring resonator.

* * * * *